(12) United States Patent
Wu et al.

(10) Patent No.: US 10,103,943 B2
(45) Date of Patent: Oct. 16, 2018

(54) NETWORK TOPOLOGY HIDING METHOD AND DEVICE

(71) Applicant: Huawei Technologies Co., Ltd., Shenzhen (CN)

(72) Inventors: Feng Wu, Shenzhen (CN); Wenzhong Ye, Shenzhen (CN); Xiangrui Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 14/739,860

(22) Filed: Jun. 15, 2015

(65) Prior Publication Data
US 2015/0381429 A1 Dec. 31, 2015

(30) Foreign Application Priority Data

Jun. 25, 2014 (CN) .......................... 2014 1 0290953

(51) Int. Cl.
*G06F 15/173* (2006.01)
*H04L 12/24* (2006.01)
(Continued)

(52) U.S. Cl.
CPC ............ *H04L 41/12* (2013.01); *H04L 61/301* (2013.01); *H04L 61/2596* (2013.01); *H04W 8/12* (2013.01); *H04W 60/00* (2013.01)

(58) Field of Classification Search
CPC ..... H04L 41/12; H04L 12/2834; H04L 12/66; H04L 61/30; H04L 61/2596;
(Continued)

(56) References Cited

U.S. PATENT DOCUMENTS 9,433,032 B1 * 8/2016 Ghadge ................. H04W 84/08
9,451,421 B1 * 9/2016 Allen ....................... H04W 4/10
(Continued)

FOREIGN PATENT DOCUMENTS

| CN | 1889560 A | 1/2007 |
|---|---|---|
| CN | 101257703 A | 9/2008 |
| CN | 103039049 A | 4/2013 |

OTHER PUBLICATIONS

"Eagle XG Diameter Signaling Router; Diameter and Mediation User Guide; 910-6822-001 Revision A," pp. 1-24, 167-209, Tekelec, Morrisville, North Carolina (Nov. 2013).
(Continued)

*Primary Examiner* — Thu Ha T Nguyen
(74) *Attorney, Agent, or Firm* — Leydig, Voit & Mayer, Ltd.

(57) ABSTRACT

The present invention provides a network topology hiding method and device. The method includes: receiving a first service request, where the first service request is sent by a subscriber through a first network function entity and includes a name of the first network function entity and a subscriber identifier; determining a virtual name set corresponding to the name of the first network function entity, where the virtual name set includes at least two virtual names; and determining one virtual name from the virtual name set, and replacing the name of the first network function entity with the determined virtual name. The unfixed replacement further ensures effectiveness of network topology hiding.

15 Claims, 4 Drawing Sheets

(51) Int. Cl.
*H04L 29/12* (2006.01)
*H04W 8/12* (2009.01)
*H04W 60/00* (2009.01)

(58) Field of Classification Search
CPC .. H04L 63/0407; H04L 2209/16; H04W 8/12; H04W 4/02; H04W 60/00
USPC .......................................... 709/204, 223, 224
See application file for complete search history.

(56) References Cited

U.S. PATENT DOCUMENTS

| | | | | |
|---|---|---|---|---|
| 9,521,439 | B1* | 12/2016 | Hsu | H04N 21/234345 |
| 9,642,077 | B2* | 5/2017 | Mathai | H04W 48/18 |
| 9,667,590 | B2* | 5/2017 | Yan | H04L 61/1511 |
| 2010/0039993 | A1* | 2/2010 | Ramankutty | H04W 88/16 370/328 |
| 2010/0220680 | A1* | 9/2010 | Ramankutty | H04W 68/08 370/329 |
| 2010/0281157 | A1* | 11/2010 | Ramankutty | H04W 24/08 709/224 |
| 2011/0047256 | A1* | 2/2011 | Babu | H04L 29/12367 709/223 |
| 2011/0128913 | A1* | 6/2011 | Chowdhury | H04L 63/0892 370/328 |
| 2011/0302244 | A1* | 12/2011 | McCann | H04L 63/0407 709/204 |
| 2012/0020343 | A1* | 1/2012 | Sugizaki | H04W 48/17 370/338 |
| 2012/0101952 | A1* | 4/2012 | Raleigh | G06Q 30/016 705/304 |
| 2012/0166618 | A1* | 6/2012 | Dahod | H04L 12/66 709/224 |
| 2012/0170547 | A1* | 7/2012 | Oprescu-Surcobe | H04W 36/0083 370/331 |
| 2012/0278490 | A1* | 11/2012 | Sennett | H04W 4/70 709/227 |
| 2012/0287854 | A1* | 11/2012 | Xie | H04W 4/005 370/328 |
| 2013/0080769 | A1* | 3/2013 | Cha | H04L 63/168 713/155 |
| 2013/0157661 | A1* | 6/2013 | Bhaskaran | H04W 60/00 455/436 |
| 2014/0105028 | A1* | 4/2014 | Bhaskaran | H04W 48/18 370/242 |
| 2014/0155109 | A1* | 6/2014 | Vaidya | H04W 8/06 455/458 |
| 2014/0242939 | A1* | 8/2014 | Salot | H04W 4/24 455/406 |
| 2014/0349614 | A1* | 11/2014 | Starsinic | H04L 63/0876 455/411 |
| 2015/0319603 | A1* | 11/2015 | Faller | H04W 8/00 455/432.1 |
| 2016/0007138 | A1* | 1/2016 | Palanisamy | H04W 4/005 455/41.2 |
| 2016/0110728 | A1* | 4/2016 | Garcia | G06Q 30/0201 705/7.29 |
| 2016/0323767 | A1* | 11/2016 | Abdullah | H04W 16/18 |
| 2017/0134444 | A1* | 5/2017 | Buckley | H04L 65/1069 |
| 2017/0134582 | A1* | 5/2017 | Shaw | H04M 3/537 |

OTHER PUBLICATIONS

"Hash table," Wikipedia, the free encyclopedia, http://wayback.archive.org/web/20120620103940/https://en.wikipedia.org/wiki/Hashtable (Jun. 14, 2012).

Maurer et al., "Hash Table Methods," Computing Surveys, vol. 7, Issue 1, ACM, New York, New York (Mar. 1975).

"Official Document IR.88—LTE and EPC Roaming Guidelines," Version 10.0, pp. 1-68, GSM Association, London, England (Jul. 10, 2013).

* cited by examiner

NETWORK TOPOLOGY HIDING METHOD AND DEVICE

CROSS-REFERENCE TO RELATED APPLICATIONS

This application claims priority to Chinese Patent Application No. 201410290953.6, filed on Jun. 25, 2014, which is hereby incorporated by reference in its entirety.

TECHNICAL FIELD

The present invention relates to the field of mobile communications technologies, and specifically, relates to a network topology hiding method and device.

BACKGROUND

With development of an IP multimedia subsystem (IP Multimedia Subsystem, IMS for short) and introduction of evolution packet core (Evolution Packet Core, EPC for short), a legacy core network based on circuit switching is evolving into a network based on IP packet switching at an ever-increasing pace, and increased use of IP-based signalling is found at a bottom layer. This results in the Diameter (Diameter) Protocol being widely applied to architectures such as IMS, policy and charging control (Policy and Charging Control, PCC for short), and EPC. Diameter signalling is used for interaction between many network elements, such as a home subscriber server (Home Subscriber Server, HSS for short), a mobility management entity (Mobile Management Entity, MME for short), a policy and charging rule function (Policy and Charging Rule Function, PCRF for short), and an online charging system (Online Charging System, OCS for short). To support inter-operator roaming and interworking, many operators start to consider deploying diameter edge agents (Diameter Edge Agents, DEAs for short) on network boundaries and building Diameter signalling networks.

The operators' efforts to set up DEA nodes and build Diameter signalling networks are mainly driven by the need to hide a network topology. As defined in related standards, fundamental network topology hiding principles are: hiding names of all Diameter nodes, and hiding the number of Diameter nodes on a network. In a scenario of inter-operator international roaming by EPC subscribers, Diameter nodes specifically refer to MMEs, and DEA deployment helps to hide architectures of the operators' internal networks, thereby protecting security of the operators' networks, specifically, preventing a visited network operator from learning about an architecture of a home operator's network. EPC roaming mainly involves S6 interfaces between MMEs and HSSs. An existing solution of hiding an operator's network topology in EPC subscriber roaming scenarios is to replace a real name of a home MME of the subscriber with a fixed virtual name and to use the virtual name for subsequent roaming related processing. However, this one-to-one fixed replacement is unable to hide the number of Diameter nodes on a network, and does not satisfy the fundamental principle of network topology hiding. Another implemented solution is to perform many-to-one replacement whereby a same DEA may process information sent by a plurality of MMEs on an operator's network, and the DEA may replace names of all the MMEs on the operator's network with a unique virtual name. This many-to-one replacement may hide the number of Diameter nodes, but it renders a home MME of a subscriber unable to be determined, which in turn leads to failures in completing a location delete procedure, which is triggered when an EPC subscriber leaves a roaming destination, or failures in subscriber data management operations (for example, inserting subscriber data or deleting subscriber data) initiated by an HSS.

The foregoing network topology hiding solutions, including both the one-to-one fixed replacement and the many-to-one replacement, suffer from different aforementioned drawbacks, and consequently compromise the effectiveness of network topology hiding.

SUMMARY

The present invention provides a network topology hiding method and device, to solve a problem in the prior art that it is difficult to ensure effectiveness of network topology hiding.

A first aspect of the present invention provides a network topology hiding method, including:

receiving a first service request, where the first service request is sent by a subscriber through a first network function entity and includes a name of the first network function entity and a subscriber identifier of the subscriber;

determining, according to a pre-established correspondence between each virtual name set and each first network function entity, a virtual name set corresponding to the name of the first network function entity, where the virtual name set includes at least two virtual names; and determining one virtual name from the virtual name set, and replacing the name of the first network function entity with the determined virtual name.

In a first possible implementation of the first aspect, the determining one virtual name from the virtual name set includes:

randomly selecting one virtual name from the virtual name set.

In a second possible implementation of the first aspect, the determining one virtual name from the virtual name set includes:

performing a hash operation on the subscriber identifier by using a preset hash algorithm, to obtain a subscriber identifier hash value; and determining, according to a pre-established correspondence between each subscriber identifier hash value and each virtual name included in the virtual name set, one virtual name corresponding to the subscriber identifier hash value.

According to the first aspect, or the first or second possible implementation of the first aspect, in a third possible implementation of the first aspect, after the determining one virtual name from the virtual name set, and replacing the name of the first network function entity with the determined virtual name, the method further includes:

sending a second service request to a second network function entity, where the second service request includes the virtual name and the subscriber identifier, so that the second network function entity processes the second service request according to the virtual name and the subscriber identifier.

According to the third possible implementation of the first aspect, in a fourth possible implementation of the first aspect, the first network function entity is a mobility management entity MME, the second network function entity is a home subscriber server HSS, the first service request is a first location update request, and the second service request is a second location update request; and the virtual name and the subscriber identifier that are included in the second location update request are used for enabling the HSS to locally establish a correspondence between the virtual name and the subscriber identifier.

According to the fourth possible implementation of the first aspect, in a fifth possible implementation of the first aspect, after the sending a second service request to a second network function entity, the method further includes:

receiving a location delete request sent by the HSS, where the location delete request includes a virtual name corresponding to a subscriber whose location information is to be deleted;

determining a virtual name set that includes the virtual name corresponding to the subscriber whose location information is to be deleted; and determining an MME corresponding to the virtual name set, and forwarding the location delete request to the determined MME, so that the MME processes the location delete request.

A second aspect of the present invention provides a network topology hiding device, including:

a first receiving module, configured to receive a first service request, where the first service request is sent by a subscriber through a first network function entity and includes a name of the first network function entity and a subscriber identifier of the subscriber;

a first determining module, configured to determine, according to a pre-established correspondence between each virtual name set and each first network function entity, a virtual name set corresponding to the name of the first network function entity, where the virtual name set includes at least two virtual names; and a first processing module, configured to determine one virtual name from the virtual name set, and replace the name of the first network function entity with the determined virtual name.

In a first possible implementation of the second aspect, the first processing module is configured to:

randomly select one virtual name from the virtual name set.

In a second possible implementation of the second aspect, the first processing module is configured to:

perform a hash operation on the subscriber identifier by using a preset hash algorithm, to obtain a subscriber identifier hash value; and determine, according to a pre-established correspondence between each subscriber identifier hash value and each virtual name included in the virtual name set, one virtual name corresponding to the subscriber identifier hash value.

According to the second aspect, or the first or second possible implementation of the second aspect, in a third possible implementation of the second aspect, the device further includes:

a sending module, configured to send a second service request to a second network function entity, where the second service request includes the virtual name and the subscriber identifier, so that the second network function entity processes the second service request according to the virtual name and the subscriber identifier.

According to the third possible implementation of the second aspect, in a fourth possible implementation of the second aspect, the first network function entity is a mobility management entity MME, the second network function entity is a home subscriber server HSS, the first service request is a first location update request, and the second service request is a second location update request; and the virtual name and the subscriber identifier that are included in the second location update request are used for enabling the HSS to locally establish a correspondence between the virtual name and the subscriber identifier.

According to the fourth possible implementation of the second aspect, in a fifth possible implementation of the second aspect, the device further includes:

a second receiving module, configured to receive a location delete request sent by the HSS, where the location delete request includes a virtual name corresponding to a subscriber whose location information is to be deleted;

a second determining module, configured to determine a virtual name set that includes the virtual name corresponding to the subscriber whose location information is to be deleted; and a second processing module, configured to determine an MME corresponding to the virtual name set, and forward the location delete request to the determined MME, so that the MME processes the location delete request.

According to the network topology hiding method and device that are provided in the present invention, each time when a first service request that is sent by a subscriber through a first network function entity corresponding to the subscriber and carries a name of the first network function entity is received, a virtual name set corresponding to the name of the first network function entity is determined according to a pre-established correspondence between each virtual name set and each first network function entity; and because each virtual name set includes a plurality of virtual names, one virtual name may be selected, from virtual name sets that have a one-to-one correspondence with first network function entities, to replace a name of a corresponding first network function entity thereby achieving network topology hiding whereby names of first network function entities on a local operator's network and a quantity of included first network function entities are hidden. Because the correspondence between each virtual name set and each first network function entity is pre-established and each virtual name set includes a plurality of virtual names, one virtual name may be selected in a near-random manner from a virtual name set corresponding to each first network function entity, to replace a real name of each first network function entity, which is equivalent to a one-to-one, unfixed replacement between real names of first network function entities and virtual names. The unfixed replacement further ensures effectiveness of network topology hiding.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
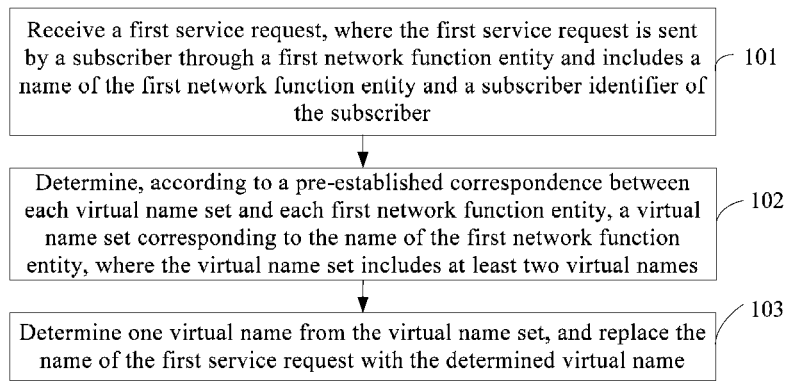
FIG. 1 is a flowchart of a network topology hiding method according to Embodiment 1 of the present invention.

FIG. 1 is a flowchart of a network topology hiding method according to Embodiment 1 of the present invention. This embodiment is executed by a DEA. As shown in FIG. 1, the method includes:

Step 101: Receive a first service request, where the first service request is sent by a subscriber through a first network function entity and includes a name of the first network function entity and a subscriber identifier of the subscriber.

Step 102: Determine, according to a pre-established correspondence between each virtual name set and each first network function entity, a virtual name set corresponding to the name of the first network function entity, where the virtual name set includes at least two virtual names.

Step 103: Determine one virtual name from the virtual name set, and replace the name of the first network function entity with the determined virtual name.

The method provided in this embodiment may be applicable to any signalling interaction procedure that is implemented between related functional entities on different operators' networks by setting up a DEA on a Diameter signalling network. For example, the method may be used on a core network, such as a general packet radio service (General Packet Radio Service, GPRS for short) network, a universal mobile telecommunications system (Universal Mobile Telecommunications System, UMTS for short), an IMS, or an EPC. Use cases of Diameter signalling on various networks include mobility management, charging, policy making and control, and so on during EPC roaming. For example, an EPC roaming scenario mainly involves an S6 interface between an MME and an HSS, and a DEA is configured to transfer Diameter signalling between a roamed-to MME and a home HSS to facilitate authentication and mobility management performed for an EPC subscriber. In this example, the first network function entity in this embodiment is the MME, and a second network function entity in the following embodiment is the HSS. For another example, a charging control scenario mainly involves interconnection between a core network and network elements, such as a PCRF and an OCS, and if an EPC subscriber accesses the network through a roamed-to packet data network gateway (PDN-Gateway, P-GW for short), a DEA is needed to implement Diameter signalling transfer among the roamed-to P-GW, a home OCS and a home PCRF. In the another example, the first network function entity in this embodiment is the P-GW, and a second network function entity in the following embodiment is the OCS or the PCRF. Signalling interaction between network function entities on two different operators' networks is processed by two DEAs in a centralized manner, one for each operator's network.

In an actual application, for example, when a subscriber on current network 1 needs to initiate an application service to a network 2, a terminal device of the subscriber sends, through a first network function entity that is responsible for receiving and processing the application service and is located on network 1, a first service request to a DEA corresponding to the network 1, where the request includes a name of the first network function entity and a subscriber identifier of the subscriber; the name of the first network function entity is a name that can identify the functional entity, for example, a device serial number; and the subscriber identifier is, for example, an international mobile subscriber identity number (International Mobile Subscriber Identity number, IMSI for short) or a mobile station international ISDN number (Mobile Station International ISDN Number, MSISDN for short).

In this embodiment, one virtual name set that has a one-to-one correspondence with each first network function entity in a network area covered by each DEA is pre-established in each DEA, which means that a correspondence between each first network function entity and a corresponding virtual name set is established in a DEA, where each virtual name set includes at least two virtual names. It can be understood that, virtual names included in different virtual name sets are different, and quantities of included virtual names may be the same or different. When receiving a first service request that carries a real name of a DEA from a first network function entity, the DEA searches locally for a virtual name set corresponding to the name of the first network function entity, determines at least one virtual name from the virtual name set, and replaces the name of the first network function entity with the determined virtual name.

In most actual applications, the DEA selects one virtual name from the determined virtual name set to replace the foregoing real name of the first network function entity. Since a first network function entity is corresponding to one virtual name set that includes a plurality of available virtual names, even when a plurality of different subscribers send a service request to the DEA through a same first network function entity, it is not certain which virtual name is selected by the DEA to replace the name of the first network function entity included in each service request, in other words, the name of the first network function entity may be replaced each time with a different virtual name in the virtual name set corresponding to the first network function entity. In this way, another network area, for example, network area 2 is uncertain of a virtual name used for replacing a real name of a same first network function entity. That is to say, since both the quantity of virtual names included in a virtual name set and a virtual name determined each time for a first network function entity are uncertain, after a plurality of first network function entities included in a network area covered by the DEA have their names replaced with different virtual names, another network area can not accurately learn how many first network function entities are included in the network area covered by the DEA and what is a name of each first network function entity, thereby accomplishing network topology hiding in the network area covered by the DEA.

In this embodiment, each time when a DEA receives a first service request that is sent by a subscriber through a first network function entity corresponding to the subscriber and carries a name of the first network function entity, a virtual name set corresponding to the name of the first network function entity is determined according to a pre-established correspondence between each virtual name set and each first network function entity. Each virtual name set includes a plurality of virtual names, one virtual name may be selected, from virtual name sets that have a one-to-one correspondence with first network function entities, to replace a name of a corresponding first network function entity, thereby achieving network topology hiding whereby names of first network function entities in a local operator's network and a quantity of included first network function entities are hidden. Since the correspondence between each virtual name set and each first network function entity is pre-established and each virtual name set includes a plurality of virtual names, one virtual name may be selected in a near-random manner from a virtual name set corresponding to each first network function entity, to replace a real name of each first network function entity, which is equivalent to a one-to-one, unfixed replacement between real names of first network function entities and virtual names. The unfixed replacement manner further ensures effectiveness of network topology hiding.

Figure 2:
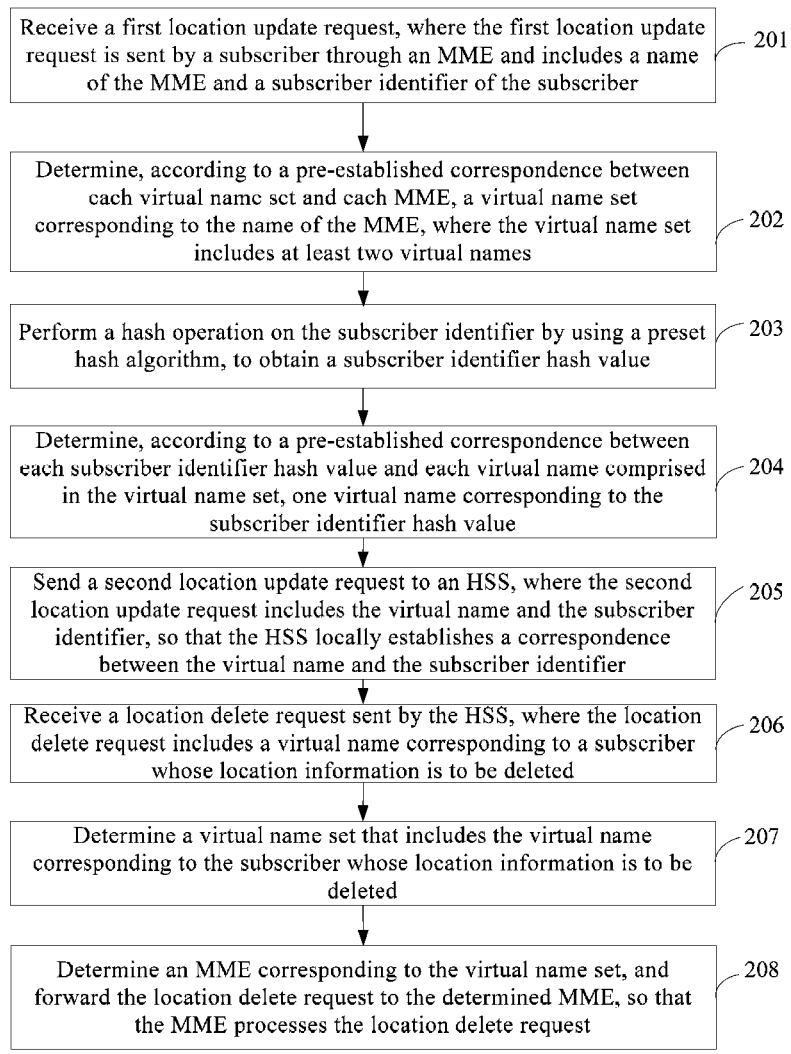
FIG. 2 is a flowchart of a network topology hiding method according to Embodiment 2 of the present invention.

FIG. 2 is a flowchart of a network topology hiding method according to Embodiment 2 of the present invention. In this embodiment, an EPC roaming scenario is used as an example to describe the network topology hiding method. As shown in FIG. 2, the method includes:

Step 201: Receive a first location update request, where the first location update request is sent by a subscriber through an MME and includes a name of the MME and a subscriber identifier of the subscriber.

Step 202: Determine, according to a pre-established correspondence between each virtual name set and each MME, a virtual name set corresponding to the name of the MME, where the virtual name set includes at least two virtual names.

In the EPC roaming scenario according to this embodiment, the foregoing subscriber is an EPC roaming subscriber. In this roaming scenario, when the subscriber roams from area 1 covered by an MME 1 with which the subscriber is registered to area 2 covered by an MME 2, the subscriber initiates a first location update request to the MME 2, so that the MME 2 updates current location information of the subscriber to a home HSS of the subscriber. The MME in the foregoing step 201 is the MME 2 in this scenario. Further, because the MME 2 and the HSS are in different network areas, to hide topology structures of networks in network areas to which the MME 2 and the HSS belong, interaction between the MME 2 and the HSS is implemented through a DEA, and the MME 2 forwards the first location update request that includes a name of the MME 2 to a DEA corresponding to the MME 2. Then, as shown in the embodiment shown in FIG. 1, the DEA determines, according to the pre-established correspondence between each virtual name set and each MME, a virtual name set corresponding to the name of the MME 2.

Step 203: Perform a hash operation on the subscriber identifier by using a preset hash algorithm, to obtain a subscriber identifier hash value.

Step 204: Determine, according to a pre-established correspondence between each subscriber identifier hash value and each virtual name included in the virtual name set, one virtual name corresponding to the subscriber identifier hash value.

In this embodiment, after the virtual name set corresponding to the MME 2 is determined, a virtual name used for replacing the name of the MME 2 needs to be selected from the virtual name set. A simple implementation manner is to randomly select one virtual name from the virtual name set. This manner is easy to implement and can accomplish network topology hiding. However, if a same subscriber initiates multiple location update requests through a same MME, which does indeed occur sometimes, a name of the same MME is randomly replaced with different virtual names, and an HSS may consider that the subscriber's location has changed and an inter-MME location update has occurred for the subscriber. In fact, the plurality of virtual names that replace the name of this MME are corresponding to the same MME, and there is no inter-MME location update. Preferably, in this embodiment, to ensure that a same MME 2 is replaced with a same virtual name when a same subscriber sends multiple location update requests through the same MME 2, the following manner is used to select a virtual name from a virtual name set corresponding to the MME 2:

performing a hash operation on the subscriber identifier of the subscriber by using a preset hash algorithm, to obtain a subscriber identifier hash value; and determining, according to a pre-established correspondence between each subscriber identifier hash value and each virtual name included in the determined virtual name set, one virtual name corresponding to the subscriber identifier hash value.

For example, assuming that a subscriber sends a first location update request through MME 2, a virtual name set corresponding to MME 2 is determined by the DEA as virtual name set 1, and an MSISDN of the subscriber is 8613600196739. Then, a hash function value V may be calculated by using a hash function f. A formula is as follows: V=f(MSISDN), where the function f may be flexibly selected. For example, digits of the MSISDN are added as follows: V=8+6+1+3+6+0+0+1+9+6+7+3+9=59, and then a virtual name is obtained from the set 1 according to the value 59, for example, according to a result of a modulo operation performed for the value 59, 59%2=1 (% represents a modulo operation). If the set 1 includes two virtual names, namely, virtual MME 1 and virtual MME 3, and a virtual name corresponding to 1 is virtual MME 3, it is determined that a virtual name of the MME 2 is replaced with virtual MME 3.

It can be learned that, in this embodiment, a DEA does not need to store a correspondence between a subscriber identifier and a real name of a network function entity, and it only needs to store a preset hash algorithm, which is easy and convenient to implement. In addition, a location update request is merely used as an example to describe interaction from an MME to an HSS; in addition to the location update request, other interaction requests, such as a request for acquiring authentication information, may also be suitable for the foregoing replacement procedure, provided that the interaction request includes a name of an MME and the name needs to be replaced with a virtual name.

Step 205: Send a second location update request to the HSS, where the second location update request includes the virtual name and the subscriber identifier, so that the HSS locally establishes a correspondence between the virtual name and the subscriber identifier.

In this embodiment, after the DEA determines a virtual name for MME 2, a name of MME 2 is replaced with the virtual name. To complete subscriber roaming processing, the DEA further needs to send, to the HSS, a second location update request that carries the virtual name that has replaced the name of MME 2 and a subscriber identifier, so that the HSS locally establishes and stores a correspondence between the virtual name and the subscriber identifier, thereby updating a current location of the subscriber in the HSS.

Step 206: Receive a location delete request sent by the HSS, where the location delete request includes a virtual name corresponding to a subscriber whose location information is to be deleted.

Step 207: Determine a virtual name set that includes the virtual name corresponding to the subscriber whose location information is to be deleted.

Step 208: Determine an MME corresponding to the virtual name set, and forward the location delete request to the determined MME, so that the MME processes the location delete request.

Specifically, if the HSS intends to delete location information of a subscriber, the HSS sends a location delete request to the DEA, where the location delete request includes a virtual name corresponding to the subscriber whose location information is to be deleted. As mentioned above, virtual names included in each virtual name set are different from one another. The DEA further determines, according to a pre-established correspondence between each MME and each virtual name set, a virtual name set that includes the virtual name corresponding to the subscriber whose location information is to be deleted, further determines an MME of the subscriber, and forwards the location delete request to the determined MME, so that the MME processes the location update request.

A location delete request is merely used as an example to describe interaction from an HSS to an MME; and in addition to the location delete request, other interaction requests, such as a request for deleting or inserting subscriber data, may also be suitable for the foregoing procedure of determining an MME corresponding to a virtual name, provided that the interaction request includes a virtual name for replacing a name of the MME.

The foregoing uses an EPC subscriber roaming scenario as an example for description. However, a person skilled in the art may understand that the method still works in another scenario in which a DEA is used for hiding a network topology, for example, in a charging control scenario. In a charging control scenario, an involved related network function entity is different than in an EPC subscriber roaming scenario, for example, a network function entity involved in a charging control scenario is a P-GW, a PCRF, or an OCS, but manners of replacing a real name of a related network function entity by a DEA are consistent; and no detail is repeatedly described.

In this embodiment, a correspondence between each virtual name set and each network function entity in a network area is pre-established in a DEA. Because each virtual name set includes a plurality of virtual names, a virtual name of each network function entity may be any of the plurality of virtual names rather than being a fixed virtual name, thereby ensuring effectiveness of network topology hiding in the network area; in addition, when a same subscriber initiates service requests through a same function entity, a hash algorithm is used to ensure that a same virtual name is used to replace a real name of the same function entity used by the same subscriber, thereby preventing the change of a virtual name from misleading an HSS into believing that the subscriber has moved from one MME to another MME.

Figure 3:
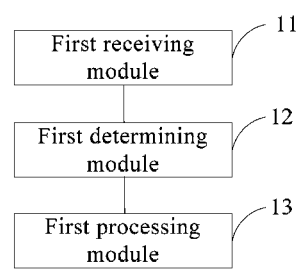
FIG. 3 is a schematic structural diagram of a network topology hiding device according to Embodiment 3 of the present invention.

FIG. 3 is a schematic structural diagram of a network topology hiding device according to Embodiment 3 of the present invention. As shown in FIG. 3, the device includes:

a first receiving module 11, configured to receive a first service request, where the first service request is sent by a subscriber through a first network function entity and includes a name of the first network function entity and a subscriber identifier of the subscriber;

a first determining module 12, configured to determine, according to a pre-established correspondence between each virtual name set and each first network function entity, a virtual name set corresponding to the name of the first network function entity, where the virtual name set includes at least two virtual names; and a first processing module 13, configured to determine one virtual name from the virtual name set, and replace the name of the first network function entity with the determined virtual name.

The device according to this embodiment may be configured to execute the technical solution in the method embodiment shown in FIG. 1. Implementation principles and technical effects of the device are similar to those of the method, and no detail is repeatedly described herein.

Figure 4:
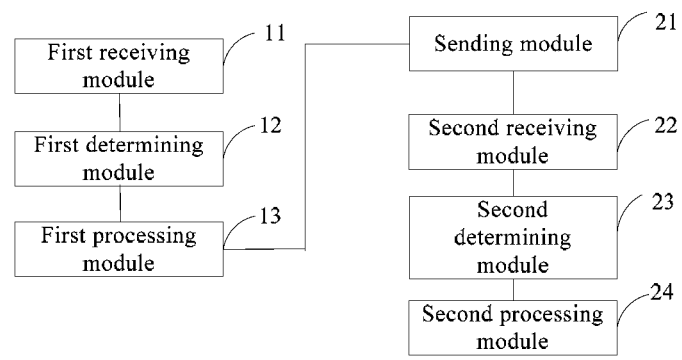
FIG. 4 is a schematic structural diagram of a network topology hiding device according to Embodiment 4 of the present invention.

FIG. 4 is a schematic structural diagram of a network topology hiding device according to Embodiment 4 of the present invention. As shown in FIG. 4, in the device based on the embodiment shown in FIG. 3, the first processing module 13 is configured to:

randomly select one virtual name from the virtual name set.

Further, the first processing module 13 is configured to:

perform a hash operation on the subscriber identifier by using a preset hash algorithm, to obtain a subscriber identifier hash value; and determine, according to a pre-established correspondence between each subscriber identifier hash value and each virtual name included in the virtual name set, one virtual name corresponding to the subscriber identifier hash value.

Further, the device further includes:

a sending module 21, configured to send a second service request to a second network function entity, where the second service request includes the virtual name and the subscriber identifier, so that the second network function entity processes the second service request according to the virtual name and the subscriber identifier.

Specifically, the first network function entity is a mobility management entity MME, the second network function entity is a home subscriber server HSS, the first service request is a first location update request, and the second service request is a second location update request; and the virtual name and the subscriber identifier that are included in the second location update request are used for enabling the HSS to locally establish a correspondence between the virtual name and the subscriber identifier.

Further, the device further includes:

a second receiving module 22, configured to receive a location delete request sent by the HSS, where the location delete request includes a virtual name corresponding to a subscriber whose location information is to be deleted;

a second determining module 23, configured to determine a virtual name set that includes the virtual name corresponding to the subscriber whose location information is to be deleted; and a second processing module 24, configured to determine an MME corresponding to the virtual name set, and forward the location delete request to the determined MME, so that the MME processes the location delete request.

The device according to this embodiment may be configured to execute the technical solution in the method embodiment shown in FIG. 2. Implementation principles and technical effects of the device are similar to those of the method, and no detail is repeatedly described herein.

Figure 5:
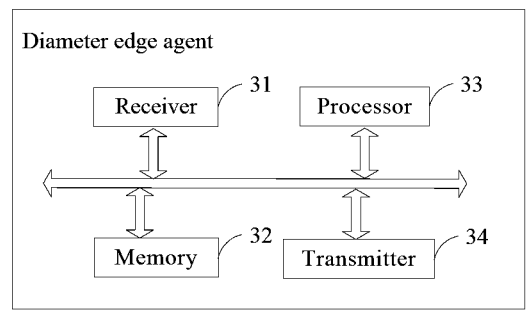
FIG. 5 is a schematic structural diagram of a diameter edge agent DEA according to Embodiment 5 of the present invention.

FIG. 5 is a schematic structural diagram of a diameter edge agent DEA according to Embodiment 5 of the present invention. As shown in FIG. 5, the DEA includes:

a receiver 31, configured to receive a first service request, where the first service request is sent by a subscriber through a first network function entity and includes a name of the first network function entity and a subscriber identifier of the subscriber; and a memory 32 and a processor 33 connected to the memory 32, where the memory 32 is configured to store a group of program code, the processor 33 is configured to call the program code stored in the memory 32, to execute the following steps of the network topology hiding method shown in FIG. 1: determining, according to a pre-established correspondence between each virtual name set and each first network function entity, a virtual name set corresponding to the name of the first network function entity, where the virtual name set includes at least two virtual names; and determining one virtual name from the virtual name set, and replacing the name of the first network function entity with the determined virtual name.

The processor 33 is further configured to randomly select one virtual name from the virtual name set.

The processor 33 is further configured to perform a hash operation on the subscriber identifier by using a preset hash algorithm, to obtain a subscriber identifier hash value; and determine, according to a pre-established correspondence between each subscriber identifier hash value and each virtual name included in the virtual name set, one virtual name corresponding to the subscriber identifier hash value.

The DEA further includes: a transmitter 34, which is configured to send a second service request to a second network function entity, where the second service request includes the virtual name and the subscriber identifier, so that the second network function entity processes the second service request according to the virtual name and the subscriber identifier.

The first network function entity is a mobility management entity MME, the second network function entity is a home subscriber server HSS, the first service request is a first location update request, and the second service request is a second location update request; and the virtual name and the subscriber identifier that are included in the second location update request are used for enabling the HSS to locally establish a correspondence between the virtual name and the subscriber identifier.

The receiver 31 is further configured to receive a location delete request sent by the HSS, where the location delete request includes a virtual name corresponding to a subscriber whose location information is to be deleted.

The processor 33 is further configured to determine a virtual name set that includes the virtual name corresponding to the subscriber whose location information is to be deleted; and determine an MME corresponding to the virtual name set, and forward the location delete request to the determined MME, so that the MME processes the location delete request.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A diameter edge agent (DEA) node in a network, the DEA comprising:
    a non-transitory computer readable medium containing instructions;
    a processor for executing the instructions and configuring the processor to provide a network topology hiding method at the diameter edge agent (DEA) node in a network, the method comprising:
        receiving, by the DEA, a first service request sent by a subscriber through a first network function entity and comprises a name of the first network function entity and a subscriber identifier of the subscriber;
        determining, by the DEA, according to a pre-established association between each virtual name set and each first network function entity, a virtual name set associated with the name of the first network function entity, wherein the virtual name set comprises at least two virtual names;
        randomly selecting, by the DEA, a virtual name from the virtual name set using the subscriber identifier, wherein the same virtual name is selected for each request when the subscriber sends multiple first service requests; and
        replacing, by the DEA, the name of the first network function entity with the randomly selected virtual name.

2. The DEA according to claim 1, wherein the processor is further configured to randomly select the virtual name by:
    performing a hash operation on the subscriber identifier using a preset hash algorithm, to obtain a subscriber identifier hash value; and
    determining, according to a pre-established association between each subscriber identifier hash value and each of the at least two virtual names comprised in the virtual name set, the virtual name associated with the subscriber identifier hash value.

3. The DEA node according to claim 1, wherein after randomly selecting the virtual name, and replacing the name of the first network function entity with the randomly selected virtual name, the processor is further configured to:
    send a second service request to a second network function entity, wherein the second service request comprises the virtual name and the subscriber identifier, so as to enable the second network function entity to process the second service request according to the virtual name and the subscriber identifier.

4. The DEA node according to claim 3, wherein:
    the first network function entity is a mobility management entity (MME);
    the second network function entity is a home subscriber server (HSS);
    the first service request is a first location update request;
    the second service request is a second location update request; and
    the virtual name and the subscriber identifier in the second location update request are used for enabling the HSS to locally establish an association between the virtual name and the subscriber identifier.

5. The DEA node according to claim 4, wherein after sending the second service request, the processor is further configured to:
    receive, from the HSS, a location delete request comprising another virtual name associated with a subscriber whose location information is to be deleted;

determine another virtual name set that comprises the another virtual name; and determine another mobility management entity (MME) associated with the another virtual name set, and forward the location delete request to the another MME, to enable the another MME to process the location delete request.

6. A non-transitory computer readable medium containing instructions that, when executed by a processor, configure the processor to:

receive a first service request sent by a subscriber through a first network function entity and comprises a name of the first network function entity and a subscriber identifier of the subscriber;

determine, according to a pre-established association between each virtual name set and each first network function entity, a virtual name set associated with the name of the first network function entity, wherein the virtual name set comprises at least two virtual names; and randomly selecting a virtual name from the virtual name set using the subscriber identifier, wherein the same virtual name is selected for each request when the subscriber sends multiple first service requests; and replace the name of the first network function entity with the randomly selected virtual name.

7. The non-transitory, computer readable medium according to claim 6, including instructions that further configure the processor is to:

perform a hash operation on the subscriber identifier using a preset hash algorithm, to obtain a subscriber identifier hash value; and determine, according to the pre-established association between each subscriber identifier hash value and each of the at least two virtual names comprised in the virtual name set, the virtual name associated with the subscriber identifier hash value.

8. The non-transitory, computer readable medium according to claim 6, including instructions that further configure the processor to:

send a second service request to a second network function entity, wherein the second service request comprises the virtual name and the subscriber identifier, so as to enable the second network function entity to process the second service request according to the virtual name and the subscriber identifier.

9. The non-transitory, computer readable medium according to claim 8, wherein:

the first network function entity is a mobility management entity (MME);

the second network function entity is a home subscriber server (HSS);

the first service request is a first location update request;

the second service request is a second location update request; and the virtual name and the subscriber identifier in the second location update request are used for enabling the HSS to locally establish an association between the virtual name and the subscriber identifier.

10. The non-transitory, computer readable medium according to claim 9, including instructions for configuring the processor to:

receive a location delete request sent by the HSS, wherein the location delete request comprises another virtual name associated with a subscriber whose location information is to be deleted;

determine a virtual name set that comprises the another virtual name associated with the subscriber whose location information is to be deleted; and determine an MME associated with the virtual name set, and forward the location delete request to the MME, to enable the MME to process the location delete request.

11. A network topology hiding device in a telecommunications system, the network topology hiding device comprising;

a memory storing executable instructions; and and a processor for executing the instructions so as to be configured to:

receive a service request sent by a subscriber through a network function entity, wherein the service request comprises a name of the network function entity and a subscriber identifier;

determine, according to a pre-established association between virtual name sets and network function entities, a virtual name set associated with the name of the network function entity, wherein the virtual name set comprises at least two virtual names; and randomly selecting a virtual name from the virtual name set, using the subscriber identifier to select the virtual name, wherein the same virtual name is selected for each request when the subscriber sends multiple requests for the same service; and replace the name of the network function entity with the randomly selected virtual name.

12. The network topology hiding device according to claim 11, wherein the processor is further configured to:

perform a hash operation on the subscriber identifier using a preset hash algorithm, to obtain a subscriber identifier hash value; and determine, according to the pre-established association between each subscriber identifier hash value and each of the at least two virtual names comprised in the virtual name set, the virtual name associated with the subscriber identifier hash value.

13. The network topology hiding device according to claim 12, wherein:

the network function entity is a mobility management entity (MME);

the another network function entity is a home subscriber server (HSS);

the service request is a first location update request;

the another service request is a second location update request; and the virtual name and the subscriber identifier in the another location update request are used for enabling the HSS to locally establish an association between the virtual name and the subscriber identifier.

14. The network topology hiding device according to claim 13, wherein the processor is further configured to:

receive a location delete request sent by the HSS, wherein the location delete request comprises another virtual name associated with a subscriber whose location information is to be deleted;

determine a virtual name set that comprises the another virtual name associated with the subscriber whose location information is to be deleted; and determine an MME associated with the virtual name set, and forward the location delete request to the MME, to enable the MME to process the location delete request.

15. The network topology hiding device according to claim 11, wherein the processor is further configured to:

send another service request to another network function entity, wherein the another service request comprises the virtual name and the subscriber identifier, so as to enable the another network function entity to process the another service request according to the virtual name and the subscriber identifier.

\* \* \* \* \*